United States Patent [19]

Bickl et al.

[11] 3,731,063

[45] May 1, 1973

[54] METHOD AND ARRANGEMENT FOR POSITIONING OF A SELECTED IMAGE IN A SEQUENCE OF IMAGES AT A PREDETERMINED LOCATION

[75] Inventors: Horst Bickl, Pullach; Josef Pfeifer, Unterhaching, both of Germany

[73] Assignee: AGFA-Gevaert Aktiengesellschaft, Leverkusen, Germany

[22] Filed: Aug. 4, 1971

[21] Appl. No.: 168,836

[30] Foreign Application Priority Data

Aug. 6, 1970 Germany....................P 20 39 208.9

[52] U.S. Cl. ..........................................235/61.11 E

[51] Int. Cl...............................................G06k 13/20

[58] Field of Search...................235/61.11 E, 61.7 R; 353/25, 26; 355/41, 40

[56] References Cited

UNITED STATES PATENTS 3,564,209 2/1971 Loughnane.....................235/61.7 R
2,580,768 1/1952 Hamilton et al. ...............235/61.7 R
2,594,358 4/1952 Shaw....................................355/41
3,457,010 7/1969 Philipp.................................353/26

*Primary Examiner*—Daryl W. Cook
*Attorney*—Michael S. Striker

[57] ABSTRACT

Microfilm is transported past a read-out station. Each of the frame of the microfilm has a code markings in a cyclic progressive code. An optical read head furnishes code marking signals corresponding to the code marking of the frame at the microfilm read-out station. A keyboard furnishes an input signal signifying a selected frame. A first comparator compares the input signal to the code marking signal and furnishes a first coincidence signal when the two are equal. The first comparator further furnishes a comparator signal determining the direction of transport of the film in dependence on the sign of the difference between the code marking signal and the input signal. A second comparator compares each code marking signal with the last previously read code marking signal and furnishes a second coincidence signal when a unit step is indicated by said comparison. The film transport is stopped upon simultaneous presence of the first and second coincidence signals.

18 Claims, 4 Drawing Figures

INVENTORS

HORST BICKL
JOSEF PFEIFER

BY

Michael S. Striker
Attorney

Patented May 1, 1973 3,731,063

3 Sheets-Sheet 2

INVENTORS
HORST BICKL
JOSEF PFEIFER
BY

INVENTORS

BY HORST BICKL
JOSEF PFEIFER

Attorneys

METHOD AND ARRANGEMENT FOR POSITIONING OF A SELECTED IMAGE IN A SEQUENCE OF IMAGES AT A PREDETERMINED LOCATION

BACKGROUND OF THE INVENTION

This invention relates to a method and arrangement for automatically positioning a selected image in a recorded sequence of images at a predetermined location. For example, the recorded sequence of images may be the material recorded in sequential frames on a microfilm, the read-out arrangement for the microfilm being at said predetermined location. In particular the present invention relates to such a method and arrangement, wherein each of said images has an associated code marking, which is read out by means of an electro-optical read head. When the so read out code marking corresponds to the marking of the selected image, the transport is stopped.

The known methods and arrangements of this type serve for selecting a single frame of the microfilm out of several thousand of such frames and positioning said frame in the window of a microfilm reader. The code markings associated with each individual frame must occupy relatively small space, and must be extremely fine. Thus, it is possible that a single scratch or speck of dust results in incorrect read-out of the code marking.

Thus, it has been attempted in conventional equipment to detect the presence of noise pulses resulting from such specks or scratches by means of the well known parity bit. However, very often not one but a number of noise pulses are present simultaneously, therefore rendering this method unreliable. This lack of reliability is a very big drawback in arrangements wherein a number of frames of the film are to be remagnified without any accompanying visual inspection.

SUMMARY OF THE INVENTION

It is an object of the present invention to effect an automatic positioning of a selected image in a recorded sequence of images which is not subject to the above-mentioned lack of reliability.

The system of this invention is a system comprising elongated signal carrier means having a sequence of images carried thereon, each of said images having an associated code marking. Transport means transports said elongated signal carrier means along a predetermined path past a predetermined location. Read-out means scan said code markings and furnish corresponding code marking signals. Input means furnish a stored input signal signifying a selected one of said images. First comparing means compare said input signal and said code marking and furnish a comparator signal indicative of the sign of the difference therebetween. The first comparing means further furnish a first coincidence signal when said code marking signal is equal to said stored input signal. Further furnished are second comparing means which compare each of said code marking signals to the last previously furnished code marking signal and furnish a second coincidence signal when a predetermined relationship exists between said so compared signals. Direction-changing means are connected to said transport means for controlling the direction of movement of said elongated signal carrier means along said predetermined path in a first or second direction in dependence upon said comparator signal. Stopping means stops the transport of said elongated signal carrier means in the simultaneous presence of said first and second coincidence signals. The predetermined relationship between the successive code markings is such that a change in a single bit takes place between sequential code markings. Since it is extremely unlikely that scratches or other noise will change two sequential code marking signals in such a manner that the determined difference still exists therebetween, it is almost 100 percent certain that the film transport will only be stopped when both the code marking signal of the image presently at the predetermined location and the code marking signal of the previous image are correct. Incorrect stopping of the transport means is therefore almost certainly precluded. In cases where the present or previous code marking signal is read out incorrectly, the transport means will transport the selected image away from the determined location in the opposite direction. However, if the next code marking signal is correct, a reversal of transport will occur, causing the selected image again to approach the predetermined location.

In case the code marking signal associated with the selected image was read out correctly and the above-mentioned error resulted from the read-out of the previously furnished code marking signal, the transport means, now operating in reverse, will cause the selected image to be positioned at the predetermined location and the transport means will then be stopped. If, however, the code marking signal associated with the selected image contains the error, the film will oscillate around the predetermined location until such time as dust specks may have been removed. If, however, the error results from a scratch or other permanent error in the code marking, the operator will notice the oscillations and will note that the selected image cannot be correctly positioned. The automatic film transport can then be disconnected and the desired image located manually. This image will of course be very close to the determined location as a result of the prior automatic search.

The existence of oscillations around the predetermined location (the change of direction of the transport means) can also be used to generate a failure signal in case a predetermined number of oscillations is exceeded.

Further, additions to the system described above can obviate the need for any manual search. Such an addition requires register marks recorded on the elongated signal carrier means, one for each of said images. A second read-out means read out the register marks and furnish register making signals in response thereto. Upon occurrence of a predetermined number of direction changes of the transport means, a difference signal is furnished corresponding to the difference between said input signal and then present code marking signal. Second counting means are present in accordance with the difference signal and count the register mark signals. When the so-counted register mark signals correspond to the difference signal, the second counting means furnish a second counting signal which operates to stop the transport means.

The register marks required for the above are generally present on the elongated signal carrier means (microfilm) in any case in order to enable the microfilm readnout during automatic operation and further to effect correct positioning of the frame within the window of the microfilm read-out equipment. Correct positioning of the selected image by means of the above-described register marking counting arrangement and method is also very reliable, since the above-described reversals in transport direction only occur when the selected image when the selected image is in the vicinity of the predetermined location.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
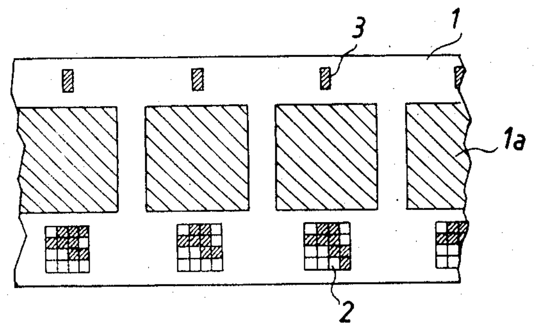
FIG. 1 shows microfilm with recorded code markings and register marks.

The preferred embodiments of the present invention will now be described with reference to the drawing.

FIG. 1 shows a strip of microfilm, labelled 1, which carries a sequence of frames each of said frames containing an image, each of said frames having an associated code marking, 2, and a register mark, 3.

Figure 2:
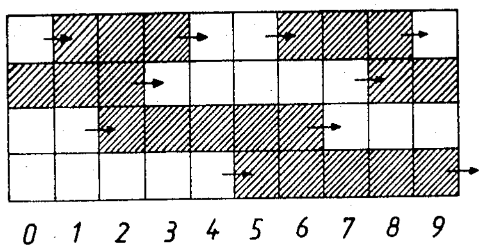
FIG. 2 is a representation of a Tompkins code.
Figure 3:
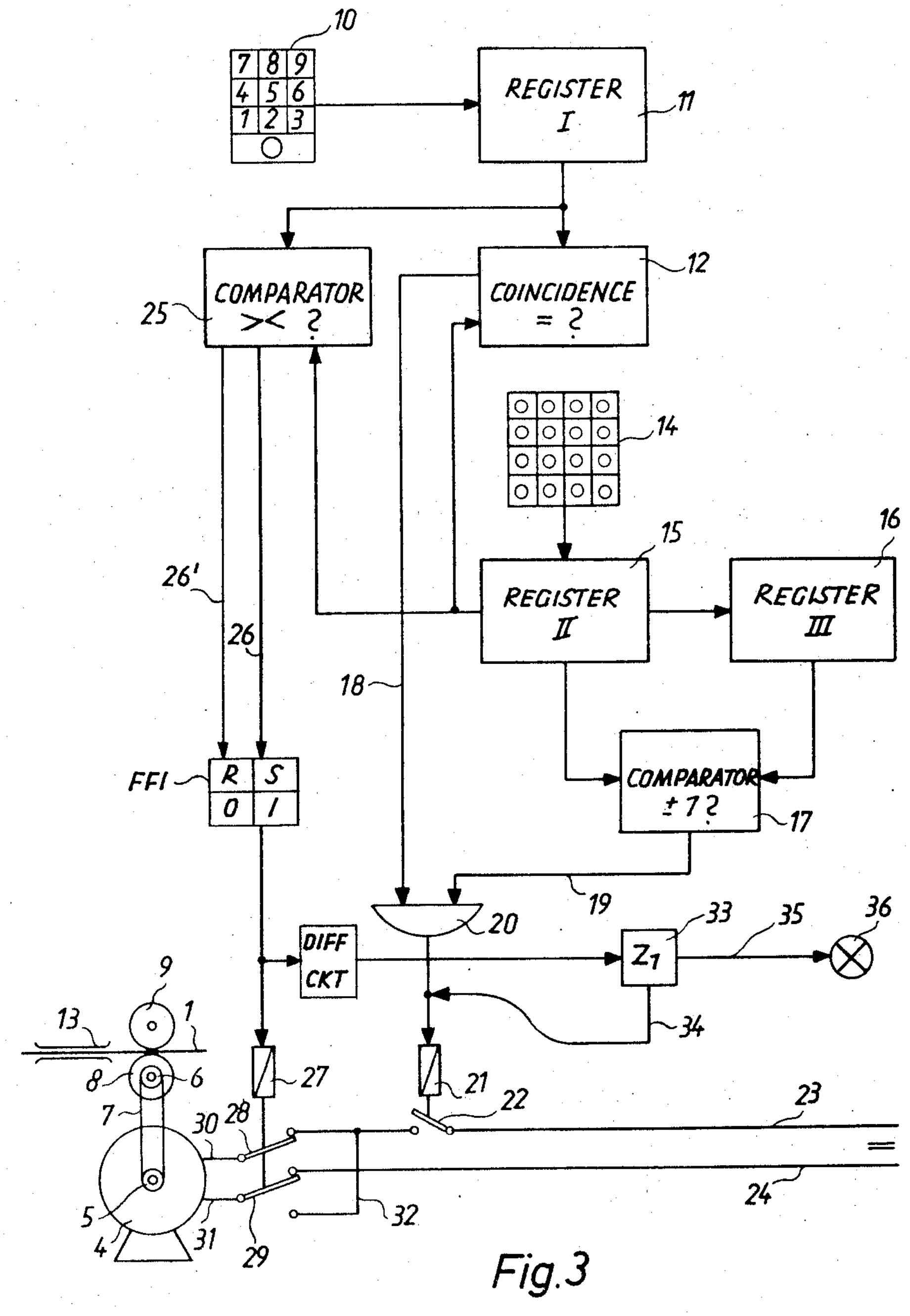
FIG. 3 is a block diagram showing the positioning arrangement of the present invention.

Before proceeding with the description of the method and arrangement of the present invention, a short description of so-called cyclic progressive codes must be given. Such codes are described in detail in the book "Switching Circuits and Logical Design" by S. H. Caldwell, published by John Wiley & Sons, 1958, on page 393. In this type of code, each numerical digit is represented by a plurality of bits, each having a "0" or "1" value. For example, 4 bits might be used to represent a single digit. As the digits progress, a unit increase in a digit is coded by changing only one of the bits representing the previous digit. Thus, if 4 bits represent a digit, three of these bits will remain the same when the digit is increased or decreased by one, while the 4th bit will have a change from "0" to a "1" value, or vice versa. One such code is the Tompkins code which is shown in FIG. 2. This Figure shows the representation of decimal digits from 0 to 9, each of these digits being represented by 4 bits. The dark fields may for example be used to signify a "0" value of a bit, while the light or unshaded fields represent a "1" value. The arrows indicate which of the bits is changing state as the decimal digit is increased from one digit value to the next digit value. As illustrated in FIG. 1, code markings, 2, each comprise four digits, each of the digits being represented by 4 bits, the change is said bits being in accordance with a cyclic progressive code and, preferably, with a Tompkins code as shown in FIG. 2. A preferred embodiment of the present invention is shown in FIG. 3. The microfilm strip 1, one embodiment of elongated signal carrier means, is transported by means of transport means, here a driving motor 4 connected by means of a pulley (5,6) and belt (7) drive to transport rollers 8 and 9. A decimal keyboard 10 is connected to first register means 11, namely a shift register which, together with said keyboard, constitutes input means. The stored input signal is the signal stored in shift register 11. First read-out means, namely electro-optical read-out means 14 read out the code markings of the particular frame passing the microfilm read-out location and furnish a code marking signal which is stored in second register means, namely shift register 15. The contents of shift register 11 and shift register 15 are compared in first comparator means 12 and a first coincidence signal is furnished on line 18 upon equality of the so-compared signals. The first comparator means further comprise a comparator stage 25 which compares the contents of register 11 to the contents of register 15 and generates a signal, herein called a comparator signal, indicating which of these values is the greater. For example, a signal might be furnished on line 26 setting flip-flop FF1 if the contents of register 11 are greater than the contents of register 15, while a signal may be furnished on line 26' resetting the flip-flop FF1 connected to the output of comparator 25. The "1" output of the flip-flop is applied to the coil of a relay 27 for controlling variable arms 28 and 29 which connect the source of voltage furnishing a voltage on lines 23 and 24 to the winding of a motor having input terminals 30 and 31. For example, the relay may, when energized, connect line 23 to line 30 and line 24 to terminal 31 and when de-energized, reverse said connection so that the polarity of voltage applied to the motor reverses, causing the motor to drive the microfilm in the opposite direction. One of the outputs of flip-flop FF1, in FIG. 3 the "1" output, may also be applied to a differentiating circuit whose output is in turn applied to a counter 33. After the count on this counter has reached a predetermined number, an output signal furnished on line 35 may serve to energize an indicator 36 showing that the desired frame cannot be found. A second output of counter 33, furnished on a line 34, may be used to activate a relay 21 which constitutes part of stopping means. This relay controls a pair of contacts which are open causing de-energization of the motor when the relay is energized and closed, allowing the motor to be energized, when the relay is de-energized. Relay 21 may also be energized by the output of an AND gate 20 which has a first input connected to the above-described coincidence circuit 12, which is part of first comparator means and a second input connected to the output of second comparator means, 17, in FIG. 3. The operation of the second comparator means is as follows: The first input of the comparator means is the signal stored in register 15. The second input to the comparator 17 is the output of a register 16. In the operation of the equipment, a code marking signal stored in register 15 is transferred to register 16 during or prior to read-out of the next subsequent code marking signal by read-out means 14. Thus, comparator 17 compares the contents of register 15, the present code marking signal, to the contents of register 16, the last previously read code marking signal. The comparison proceeds digit by digit (for example, line by line of the code markings). The units line is compared to determine whether a single bit change has occurred. The tens, hundreds and thousands lines are tested either for change of a single bit or for equality of all bits. The criterion depends upon the next-lower place value. For example, if the second line corresponds to the tens digit, this would be examined for a unit change if the unit digit stored in register 16 were a 9 and the tens digit would be tested for equality, if the units digit stored in register 16 were 1 through 8, under conditions of a forward transport direction. If the transport direction is in a reverse direction, a unit digit of 0 stored in register 16 would cause testing of the decimal digits for a unit change. Testing of the hundreds and thousands digits proceeds in the same manner, the hundreds digit being tested for unit change or complete equality, depending upon the value of the tens digit stored in register 16, while the testing of the thousands digit for equality or unit change depends upon the value of the hundreds digit stored in register 16.

Figure 4:
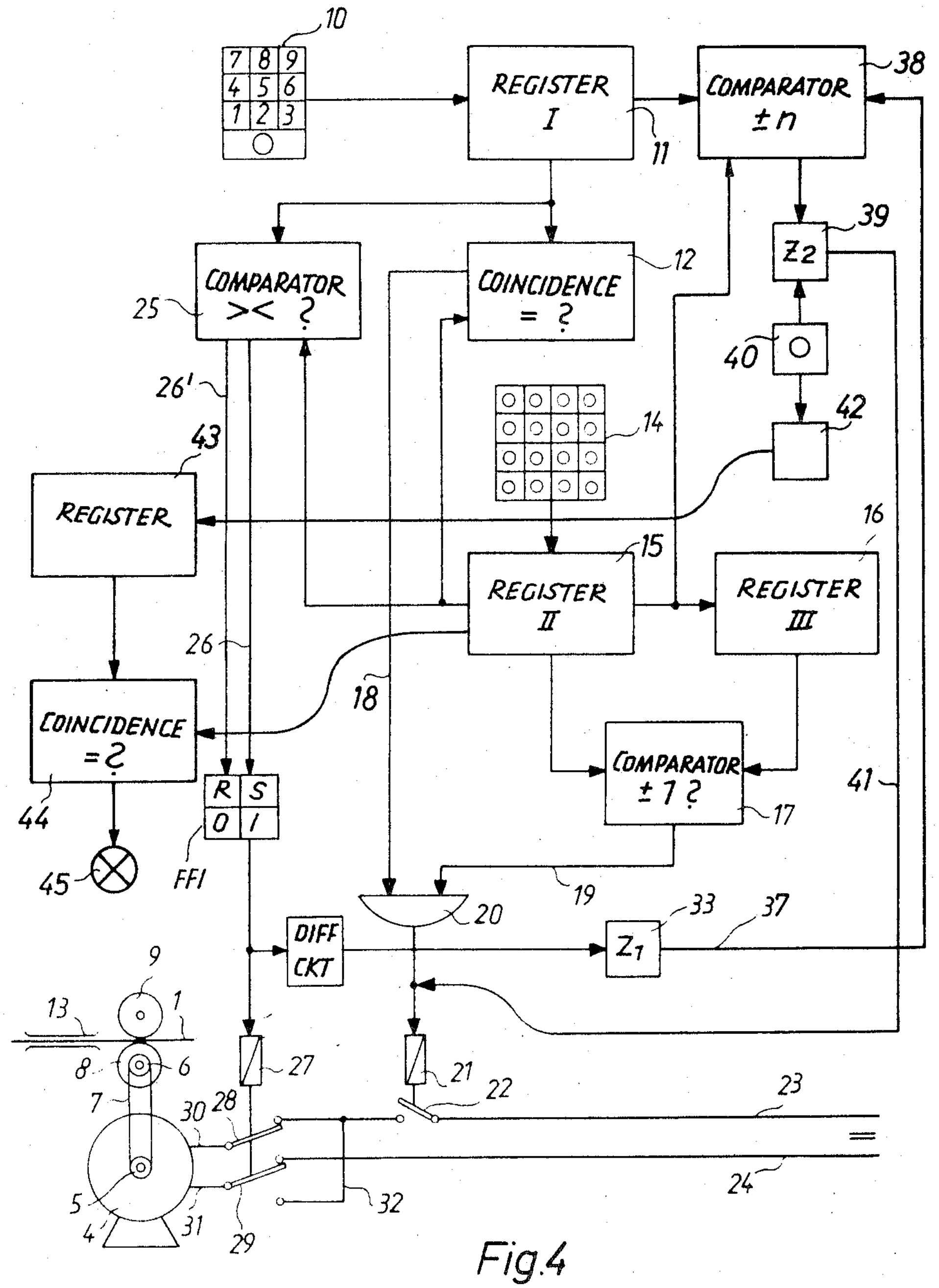
FIG. 4 is a block diagram of a second preferred embodiment of the present invention.

If all comparisons show that the contents of register 16 have the correct relationship to the contents of register 15, a second coincidence signal is furnished on line 15 which is applied to the second input of AND gate 20. Simultaneous presence of a signal on lines 18 and 19 causes an output from AND gate 20 which, as described above, energizes relay 21, thereby stopping the motion of the film. The embodiment of the present invention shown in FIG. 4 is the same as that shown in FIG. 3, except that counter 33 does not cause the film transport to stop when a predetermined number of changes in direction have taken place. In the embodiment of FIG. 4, a signal is furnished on line 37 when a predetermined number of such direction reversals have been counted, and this signal is used to enable third comparing means, namely a comparator 38. Following an enabling signal from counter 33, comparator 38 compares the contents of register 1 (stored input signal) to the contents of register 2 (code marking signal corresponding to the image currently at the window of the microfilm equipment). Comparator 38 furnishes a difference signal corresponding to the difference between the contents of register 11 and register 15 at a third comparing output, namely the output connected to counter 39. Counter 39 represents second counting means which are preset by means of the difference signal furnished by comparator 38. Additional read-out means, namely the read-out head 40, is operatively associated with the elongated signal carrier means and is positioned to read out the register mark and furnish register mark signals in response thereto. The register mark signals are counted by counter 39 and when the number of so counted register marks is equal to the number preset in counter 39 by comparator 38, counter 39 furnishes a second counting signal which stops the transport of the film by energizing relay 21 thereby opening switch 22.

In a further extension of the present invention the second electro-optical read-out means 40 are further connected to a counter 42. This counter is a forward-reverse counter which is set to a number corresponding to any selected image presently at the window of the equipment. Thereafter, counter 42 counts register marks as furnished by the register marking signals furnished by read-out head 40 both in the forward and reverse direction depending upon the direction of transport of the film. The resulting number is shifted into a shift register 43 whose contents are compared with the contents of register 15, namely the code marking signal furnished by read-out means 14. If the two numbers do not agree, fourth comparing means, namely a comparator 44 furnish a signal which indicates to the operator that the equipment is not working properly.

While the invention has been illustrated and described as embodied in particular types of digital circuits, it is not intended to be limited to the details shown, since various structural and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

1. Method for positioning a selected one of a sequence of recorded images in a determined location, each of said images having a corresponding recorded code marking signifying its position in said sequence, comprising, in combination, the steps of furnishing an input signal signifying said position in said sequence of said selected one of said images; storing said input signal, thus furnishing a stored input signal; transporting said sequence of images past said predetermined location; reading out the recorded code marking corresponding to the image at said predetermined location, thereby furnishing a code marking signal; comparing each of said so furnished code marking signals to said stored input signal and furnishing a first coincidence signal when said code marking signal is equal to said stored input signal, and a comparison signal indicative of the sign of the difference therebetween when said code marking signal is unequal to said stored input signal; controlling the direction of transport of said sequence of images past said predetermined location in dependence upon said comparison signal; further comparing each of said code marking signals to the last previously furnished one of said code marking signals and furnishing a second coincidence signal when said so compared code marking signals have a predetermined difference; and stopping the transport of said sequence of images past said predetermined location only upon simultaneous receipt of said first and second coincidence signals.

2. A method as set forth in claim 1, further comprising the steps of furnishing a direction-change signal upon each change in direction of said transporting of said sequence of images past said predetermined location; counting said direction-change signals; and furnishing a failure signal when the number of said direction-change signals exceeds a predetermined number.

3. A method as set forth in claim 1, wherein each of said recorded images further has a recorded register mark; further comprising the steps of furnishing a direction-change signal upon each change of direction of said transport of said sequence of recorded images past said predetermined location; counting said direction-change signals; furnishing an excess direction-change signal when the number of said direction-change signal exceeds a determined number; reading out the recorded code marking of the recorded image at said predetermined location upon occurrence of said excess direction-change signal, thereby furnishing a starting marking signal; comparing said starting marking signal to said stored input signal and furnishing a difference signal corresponding to the difference therebetween; counting said recorded register marks following receipt of said excess direction-change signal; and stopping said transport of said recorded images past said determined location when the number of said so counted recorded register marks is equal to said difference signal.

4. A method as set forth in claim 1, wherein each of said recorded images further has a recorded register mark; further comprising the steps of furnishing a starting marking signal signifying a predetermined one of said recorded images at said determined location; algebraically adding the number of register marks corresponding to the number of recorded images transported past said determined location to said starting marking signal, thereby furnishing a present marking signal; comparing said present marking signal to said code marking signal and furnishing a failure signal upon inequality between said present marking signal and said code marking signal.

5. A method as set forth in claim 1, wherein said code markings are in a cyclic progressive code.

6. Selection arrangement comprising, in combination, elongated signal carrier means having a sequence of images and a corresponding sequence of code markings, one for each of said images, recorded thereon; transport means transporting said elongated signal carrier means along a predetermined path past a predetermined location; read-out means operatively associated with said elongated signal carrier means for reading out the one of said code markings associated with the one of said images at said predetermined location and furnishing a code marking signal corresponding thereto; input means furnishing a stored input signal corresponding to an externally selected one of said images; first comparing means comparing said code marking signal and said stored input signal, for furnishing a comparator signal indicative of the sign of the difference therebetween and a first coincidence signal indicative of equality therebetween; second comparing means comparing said code marking signal to the last previously read out one of said code marking signals and furnishing a second coincidence signal when said so compared signals have a predetermined relationship; direction-changing means connected to said transport means for controlling the direction of movement of said elongated signal carrier means along said predetermined path in dependence upon said comparator signal; and stopping means stopping the transport of said elongated signal carrier means only in response to the simultaneous presence of said first and second coincidence signals, whereby the transport of said elongated signal carrier means is stopped only when said predetermined relationship exists between sequential ones of said code marking signals thereby eliminating incorrect stopping due to defacement or dirt on said code markings.

7. An arrangement as set forth in claim 6, wherein said input means comprise a decimal keyboard for furnishing an input signal signifying the selected one of said images, and first register means storing said input signal thereby furnishing said stored input signal.

8. An arrangement as set forth in claim 6, wherein said read-out means comprise electro-optical read-out means and second register means connected to the output of said electro-optical read-out means for furnishing said code marking signals.

9. An arrangement as set forth in claim 8, wherein said code markings are in a cyclic progressive code, each of said code markings comprising a plurality of bits; and wherein said predetermined relationship is a change in a single one of said bits.

10. An arrangement as set forth in claim 9, further comprising third register means connected to the output of said second register means and having an output connected to said second comparing means for storing said code marking signals upon read-out of the next subsequent one of said code marking signals.

11. An arrangement as set forth in claim 6, wherein said transport means comprise motor means, and a source of voltage connected to said motor means for the energization thereof; and wherein said stopping means comprise an AND gate, having a first and second AND gate input respectively connected to the output of said first and second comparing means, and an AND gate output, and disconnect relay means connected to said AND gate output for disconnecting said source of voltage from said motor means in response to a signal at said AND gate output.

12. An arrangement as set forth in claim 11, wherein said direction-changing means comprise additional relay means having relay contacts interconnecting said source of voltage and said motor means in such a manner that the polarity of voltage applied to said motor means depends upon said comparator signal.

13. An arrangement as set forth in claim 12, wherein said comparator signal comprises a first direction signal indicative of required movement of said elongated signal carrier means in a first direction, and a second direction signal indicative of required movement in a second direction opposite to said first direction; further comprising first counting means counting changes from said first direction signal to said second direction signal and furnishing a first counting signal signifying said so counted changes.

14. An arrangement as set forth in claim 13, further comprising failure signal furnishing means connected to said counting means for furnishing a failure signal when said counting signal signifies a number of changes exceeding a predetermined number of changes.

15. An arrangement as set forth in claim 13, wherein said elongated signal carrier means further has a plurality of register marks one associated with each of said images; further comprising third comparing means having a first input connected to said input means and a second input connected to said read-out means for comparing said input signal and said code marking signal and furnishing a difference signal corresponding to the difference therebetween at a third comparing output; additional read-out means operatively associated with said elongated signal carrier means for reading said register marks and furnishing register mark signals in response thereto; second counting means having a preset input connected to said comparing output for presetting said second counting means to correspond to said difference signal, said second counting means further having a counting input for counting said register mark signals, said second counting means furnishing a second counting signal when the number of register mark signals received at said counting input corresponds to said difference signal; and means interconnecting the output of said second counting means and said stopping means in such a manner that said transport of said elongated signal carrier means is stopped in response to said second counting signal.

16. An arrangement as set forth in claim 15, wherein said third comparing means has an enable input connected to the output of said first counting means, for enabling said third comparing means only upon receipt of a first counting signal signifying a predetermined number of said changes of direction.

17. An arrangement as set forth in claim 6, wherein said elongated signal carrier means further has a plurality of register marks, one associated with each of said images; further comprising additional read-out means for reading said register marks and furnishing register mark signals in response thereto; third counting means connected to said additional read-out means for counting said register mark signals in a forward or reverse sense depending upon said comparator signal and furnishing a third counting signal signifying the number of so counted register mark signals; fourth comparing means comparing said third counting signal to said code marking signal and furnishing an additional failure alarm signal when said third counting signal is unequal to said code marking signal.

18. An arrangement as set forth in claim 6, wherein said elongated signal carrier means comprise microfilm and said selected image is one frame of said microfilm; and further comprising microfilm-reading means for reading single frames of said microfilm, at said predetermined location.

* * * * *